US012625737B2

(12) United States Patent
Hsu et al.

(10) Patent No.:    US 12,625,737 B2
(45) Date of Patent:       May 12, 2026

(54) SELF-RECOVERING METHOD OF PHYSICAL LAYER OF BASE STATION AND BASE STATION APPARATUS

(71) Applicant: Aespula Technology INC., Zhubei City (TW)

(72) Inventors: Terng-Yin Hsu, Zhubei City (TW); Yuan-Te Liao, Zhubei City (TW); Shung-Mei Koh, Zhubei City (TW)

(73) Assignee: Aespula Technology INC., Zhubei City (TW)

( * ) Notice: Subject to any disclaimer, the term of this patent is extended or adjusted under 35 U.S.C. 154(b) by 589 days.

(21) Appl. No.: 18/165,467

(22) Filed: Feb. 7, 2023

(65) Prior Publication Data

US 2024/0264876 A1     Aug. 8, 2024

(51) Int. Cl.
| | |
|---|---|
| *G06F 9/50* | (2006.01) |
| *G06F 9/48* | (2006.01) |
| *H04W 24/04* | (2009.01) |
| *H04W 28/08* | (2023.01) |

(52) U.S. Cl.
CPC ............ *G06F 9/505* (2013.01); *G06F 9/4881* (2013.01); *G06F 9/4887* (2013.01); *H04W 24/04* (2013.01); *H04W 28/0908* (2020.05); *G06F 9/5038* (2013.01); *G06F 2209/5022* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 10,552,215 B1* | 2/2020 | Xu | .......................... | G06F 9/526 |
| 2004/0187120 A1* | 9/2004 | Moore | ................... | G06F 9/4881 |
| | | | | 718/100 |
| 2005/0283785 A1* | 12/2005 | D'Souza | ............... | G06F 9/4881 |
| | | | | 718/100 |
| 2007/0050779 A1* | 3/2007 | Hayashi | ................ | G06F 9/4887 |
| | | | | 718/108 |

(Continued)

FOREIGN PATENT DOCUMENTS

CN          103118359  A       5/2013

*Primary Examiner* — Abu Zar Ghaffari
(74) *Attorney, Agent, or Firm* — RABIN & BERDO, P.C.

(57) ABSTRACT

A processor of a base station apparatus executes steps of: (a) executing multiple first tasks, one by one, during a time period of one of m time slots in a normal mode in a thread pool; (b) when finishing executing the first tasks, recording first statuses of the first tasks into the task status vector table; (c) when finishing recording the first statuses of the first tasks, determining whether all of second statuses of second tasks of a previous $k^{th}$ time slot of the m time slots recorded in the task status vector table are executed statuses; if yes, returning to the step (a); if not, executing at least one of the second tasks of the previous $k^{th}$ time slot having an unexecuted status within next p consecutive time slots in a load reduction mode, and then returning to step (a); m, k, and p are positive integers. The processor executes the tasks in the load reduction mode for self-recovering so that the base station apparatus can avoid crashing.

7 Claims, 4 Drawing Sheets

(56)　　　　　References Cited

U.S. PATENT DOCUMENTS

| 2008/0066072 | A1* | 3/2008 | Yurekli | G06Q 10/06 |
| | | | | 718/104 |
| 2010/0083265 | A1* | 4/2010 | Booton | G06F 9/4887 |
| | | | | 718/103 |
| 2014/0196045 | A1* | 7/2014 | Kurata | G06F 9/462 |
| | | | | 718/102 |
| 2014/0373023 | A1* | 12/2014 | Arakawa | G06F 9/505 |
| | | | | 718/103 |
| 2015/0026699 | A1* | 1/2015 | Nakamura | G06F 11/3055 |
| | | | | 718/106 |
| 2015/0135185 | A1* | 5/2015 | Sirota | H04L 67/10 |
| | | | | 718/103 |
| 2016/0055032 | A1* | 2/2016 | David | G06F 11/0793 |
| | | | | 718/107 |
| 2018/0182059 | A1* | 6/2018 | Achiwa | H04N 1/0083 |
| 2019/0129993 | A1* | 5/2019 | Stanfill | G06F 11/1492 |
| 2019/0310892 | A1* | 10/2019 | Frolikov | G06F 9/4881 |
| 2020/0201636 | A1* | 6/2020 | Alexander | G06F 13/4027 |
| 2023/0161629 | A1* | 5/2023 | Saja | G06F 9/5088 |
| | | | | 718/104 |
| 2024/0223344 | A1* | 7/2024 | Huang | H04L 5/0073 |
| 2024/0370075 | A1* | 11/2024 | Subramanian | G06F 9/5094 |

* cited by examiner

SELF-RECOVERING METHOD OF PHYSICAL LAYER OF BASE STATION AND BASE STATION APPARATUS

BACKGROUND OF THE INVENTION

1. Field of the Invention

The present invention relates to a self-recovering method and an apparatus, especially a self-recovering method of a physical layer of a base station, and a base station apparatus.

2. Description of the Related Art

A base station is a cell site being a cellular-enabled mobile device site. The base station is used to receive data packages from mobile devices or transmit the data packages to the mobile devices.

Further, the base station needs to execute tasks when receiving the data packages from the mobile devices, and the base station executes n tasks during each time slot.

However, when the base station cannot execute n tasks within one time slot due to excessive workload, there will be multiple undone tasks during such one time slot. The undone tasks may negatively affect performance of the base station. Namely, if a number of the undone tasks is too many, the base station may crash.

Therefore, the base station needs to be improved.

SUMMARY OF THE INVENTION

In view of the above-mentioned needs, the main purpose of the present invention is to provide a self-recovering method of a physical layer of a base station, and a base station apparatus. The base station apparatus includes a memory and a processor. The processor is electrically connected to the memory.

The memory stores a task status vector table.

The processor executes the self-recovering method of the physical layer of the base station, and the self-recovering method includes steps of:

(a) executing multiple first tasks, one by one, during a time period of one of m time slots in a normal mode in a thread pool;

(b) when finishing executing the first tasks, recording first statuses of the first tasks into a task status vector table; wherein the task status vector table further records second statuses of second tasks of the m time slots other than the one of the m time slots having the first tasks;

(c) when finishing recording the first statuses of the first tasks, determining whether all of the second statuses of the second tasks of a previous $k^{th}$ time slot of the m time slots recorded in the task status vector table are executed statuses;

when the second statuses of the second tasks of the previous $k^{th}$ time slot recorded in the task status vector table are all executed statuses, returning to the step (a);

when any one of the second statuses of the second tasks of the previous $k^{th}$ time slot recorded in the task status vector table is not the executed status, executing at least one of the second tasks of the previous $k^{th}$ time slot having an unexecuted status within next p consecutive time slots in a load reduction mode, and returning to the step (a);

wherein the at least one of the second tasks of the previous $k^{th}$ time slot having the unexecuted status in the thread pool is executed in a same thread pool within the next p consecutive time slots;

wherein m, k, and p are positive integers;

wherein p+k≤m;

wherein the base station apparatus is a cell site for communicating with mobile devices;

wherein p is determined according to the statuses of the second tasks of the previous $k^{th}$ time slot recorded in the task status vector table;

wherein the smaller a number of the executed statuses of the second tasks of the previous $k^{th}$ time slot recorded in the task status vector table is, the greater p is.

Since the processor of the base station apparatus can execute the tasks in the load reduction mode during next p consecutive time slots, the base station apparatus can self-recover to avoid crashing.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
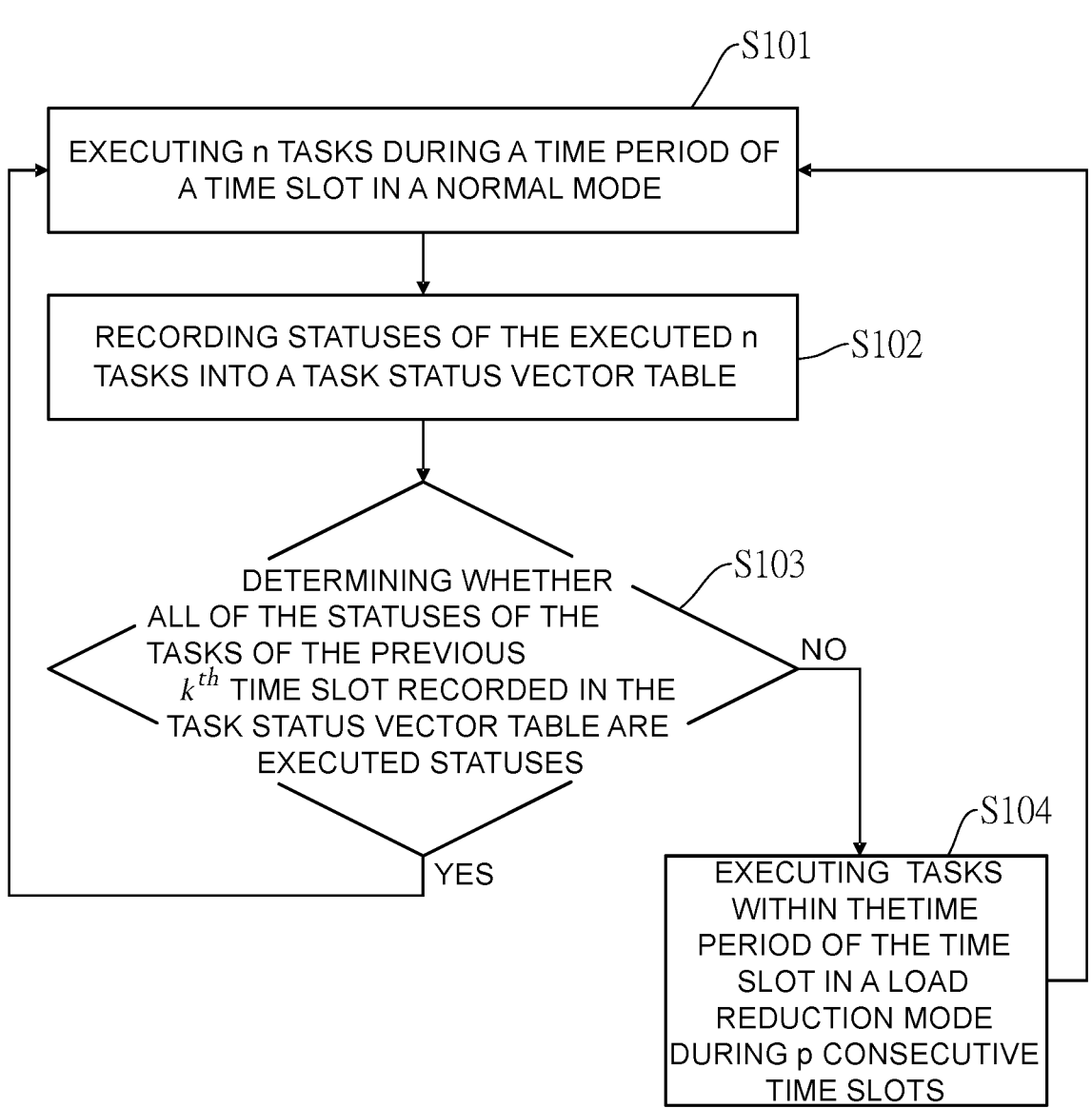
FIG. 1 is a flowchart of a self-recovering method of a physical layer of a base station of the present invention.

FIG. 1 is a flowchart of a self-recovering method of a physical layer of a base station, which is executed by a base station apparatus. In an embodiment, the base station apparatus 1 may be a cell site for communicating with mobile devices.

Figure 2:
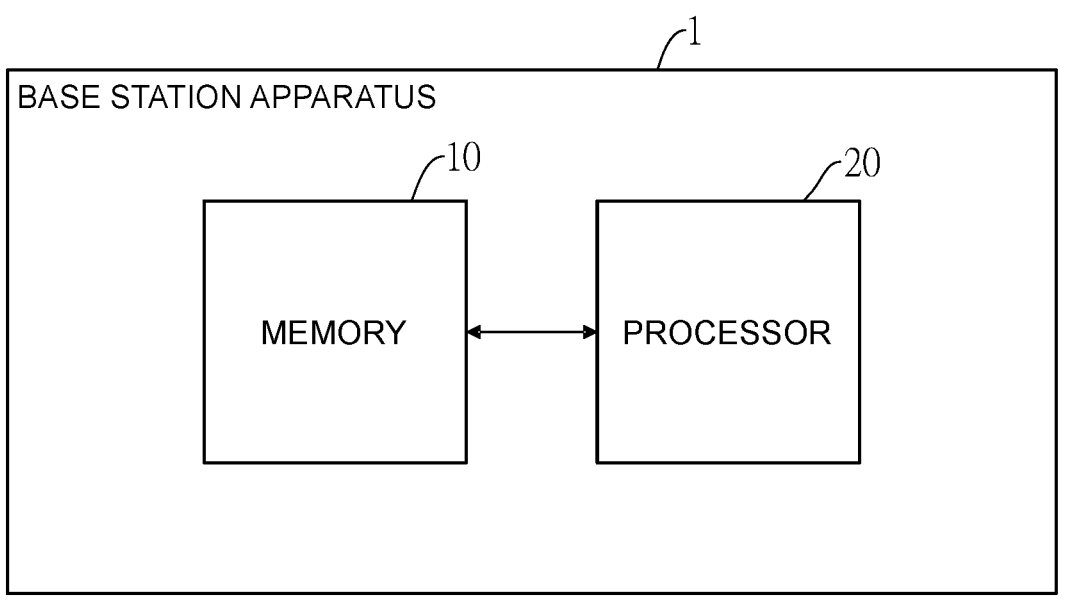
FIG. 2 is a block diagram of a base station apparatus of the present invention.

Further with reference to FIG. 2, the base station apparatus 1 includes a memory 10 and a processor 20. The processor 20 is electrically connected to the memory 10.

Figure 3:
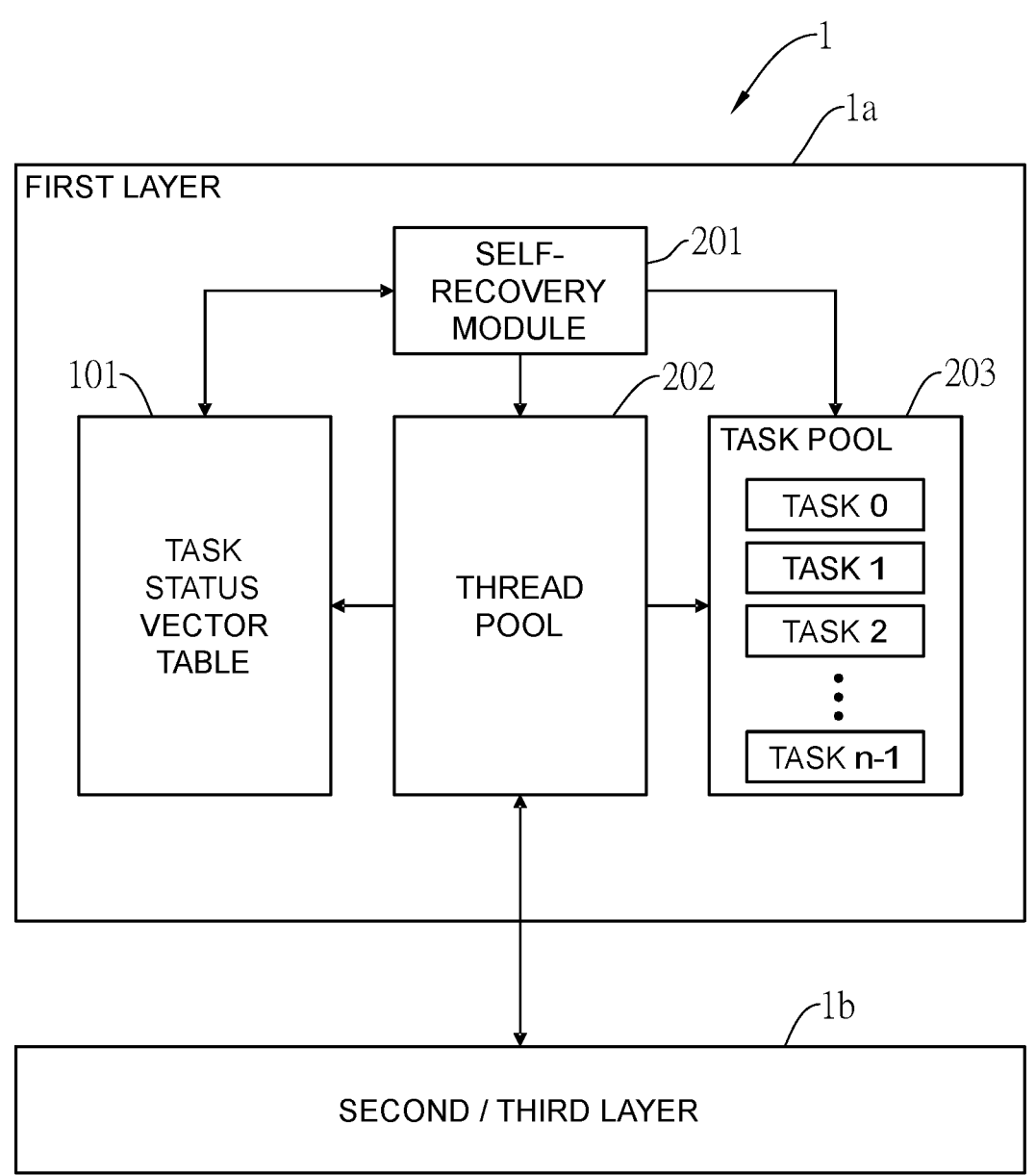
FIG. 3 is a schematic block diagram of the base station apparatus of the present invention.

With reference to FIG. 3, in the embodiment, the base station apparatus 1 includes a first layer 1a, and a second/third layer 1b. For example, the first layer 1a may be a physical layer, and the second/third layer 1b may be a medium access control (MAC) layer, a Radio Link Control (RLC) layer, a Packet Data Convergence Protocol (PDCP) layer, or a Radio Resource Control (RRC) layer.

The memory 10 and the processor 20 correspond to the first layer 1a, and the memory 10 stores a task status vector table 101. The first layer 1a further includes a self-recovery module 201, a thread pool 202, and a task pool 203. The self-recovery module 201 assigns parameters of the tasks to the task pool 203. The thread pool 202 can read tasks from the task pool 203, and execute the tasks. The thread pool 202 further records statuses of executed tasks in the task status vector table 101.

Moreover, the self-recovery module 201 of the processor 20 executes the self-recovering method, and the self-recovering method includes the following steps.

In step S101, the processor 20 executes n tasks during a time period of a time slot in a normal mode.

In step S102, the processor 20 records statuses of the executed n tasks into the task status vector table 101.

In step S103, the processor 20 determines whether all of the statuses of the tasks of a previous $k^{th}$ time slot recorded in the task status vector table 101 are executed statuses.

When the statuses of the tasks of the previous $k^{th}$ time slot recorded in the task status vector table 101 are all executed statuses, the processor 20 returns to execute the step S101.

In step S104, when any one of the statuses of the tasks of the previous $k^{th}$ time slot recorded in the task status vector table 101 is not the executed status, after the processor 20 executes tasks within the time period of the time slot in a load reduction mode during next p consecutive time slots, the processor 20 returns to execute the step S101.

Further, n, k, and p are positive integers.

For example, the task status vector table 101 is shown below. The task status vector table 101 records the statuses of the tasks of m time slots. The processor 20 is executing the tasks within the time slot X, and particularly is executing the second task having a task number 1. Further, the previous $k^{th}$ time slot recorded in the task status vector table 101 has a slot number X–k. In the embodiment, m and X are positive integers.

| Task Status Vector Table | | |
|---|---|---|
| Slot Number | Task Number | status |
| X–m + 1 | 0 | Executed |
| | 1 | Executed |
| | 2 | Executed |
| | . . . | . . . |
| | n-1 | Executed |
| . | . | . |
| . | . | . |
| . | . | . |
| X–k | 0 | Executed |
| | 1 | Executed |
| | 2 | Unexecuted |
| | . . . | . . . |
| | n-1 | Executed |
| . | . | . |
| . | . | . |
| . | . | . |
| X-1 | 0 | Executed |
| | 1 | Executed |
| | 2 | Executed |
| | . . . | . . . |
| | n-1 | Executed |
| X | 0 | Executed |
| | 1 | Executing |
| | 2 | Unexecuted |
| | . . . | . . . |
| | n-1 | Unexecuted |

In the task status vector table 101, it is obviously known that the statuses of the tasks of the previous $k^{th}$ time slot recorded in the task status vector table 101 have at least one task in an unexecuted status. For example, the third task of the previous $k^{th}$ time slot having a task number 2 is in the unexecuted status.

Figure 4:
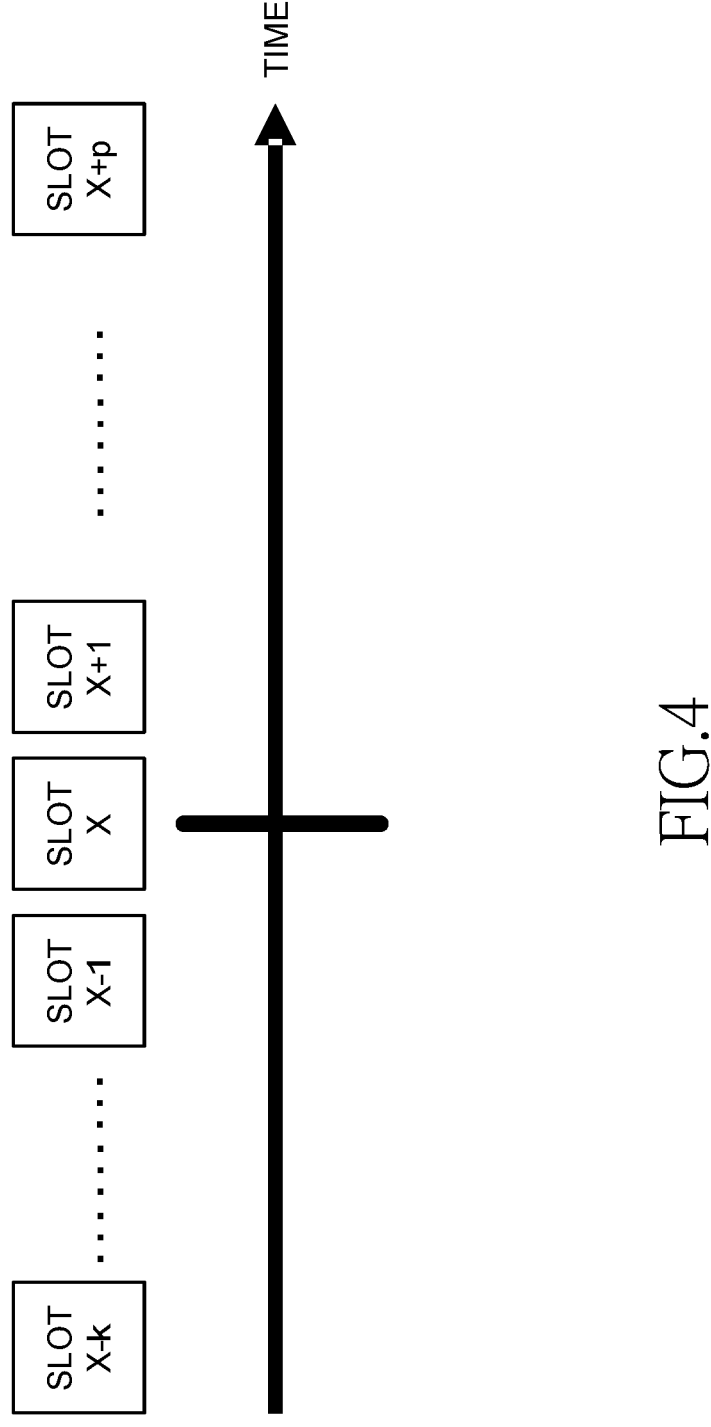
FIG. 4 is a schematic diagram of the self-recovering method of the present invention.

With reference to FIG. 4, since the previous $k^{th}$ time slot recorded in the task status vector table 101 has at least one task in the unexecuted status, the processor 20 needs to execute the tasks in the load reduction mode during next p consecutive time slots. For example, the processor 20 executes the tasks in the load reduction mode from the slot X+1 to the slot X+p.

In the embodiment, p+k≤m. Further, when the processor 20 executes tasks in the load reduction mode, a workload for processing the tasks within the next p consecutive time slots is reduced. For example, when the workload is reduced, the processor 20 processes i tasks within the next p consecutive time slots in the load reduction mode, and the processor 20 further processes the at least one task in the unexecuted status during time periods after processing the i tasks within the next p consecutive time slots. In the embodiment, i is a positive integer, and i≤n.

For example, when the processor 20 executes tasks in the load reduction mode, the processor 20 further processes the at least one task of the previous $k^{th}$ time slot having the unexecuted status during the next p consecutive time slots.

Moreover, p is determined according to the statuses of the tasks of the previous $k^{th}$ time slot recorded in the task status vector table 101. In the embodiment, the smaller a number of the executed statuses of the tasks of the previous $k^{th}$ time slot recorded in the task status vector table 101 is, the greater p is. For example, if the statuses of the tasks of the previous $k^{th}$ time slot is recorded in the following Table 1, the number of the executed statuses may be n–3. Therefore, p may be determined to be 10.

TABLE 1

| Slot Number | Task Number | status |
|---|---|---|
| X-k | 0 | Unexecuted |
| | 1 | Unexecuted |
| | . . . | . . . |
| | n-4 | Unexecuted |
| | n-3 | Executed |
| | n-2 | Executed |
| | n-1 | Executed |

However, if the statuses of the tasks of the previous $k^{th}$ time slot are recorded in the following Table 2, the number of the executed statuses may be n–1. Namely, the number of the executed statuses recorded in Table 2 is greater than the number of the executed statuses recorded in Table 1. Therefore, in Table 2, p may be determined to be smaller than 10, and p may be 5.

TABLE 2

| Slot Number | Task Number | status |
|---|---|---|
| X-k | 0 | Unexecuted |
| | 1 | Executed |
| | 2 | Executed |
| | . . . | . . . |
| | n-1 | Executed |

In conclusion, when the previous $k^{th}$ time slot has at least one unexecuted status, the processor 20 of the base station apparatus 1 can execute tasks in the load reduction mode for self-recovering so that the base station apparatus 1 can avoid crashing.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A self-recovering method of a physical layer of a base station, executed by a processor of a base station apparatus, and comprising steps of:

(a) executing multiple first tasks, one by one, during a time period of one of m time slots in a normal mode in a thread pool;

(b) when finishing executing the first tasks, recording first statuses of the first tasks into a task status vector table, wherein the task status vector table further records second statuses of second tasks of the m time slots other than the one of the m time slots having the first tasks;

(c) when finishing recording the first statuses of the first tasks, determining whether all of the second statuses of the second tasks of a previous $k^{th}$ time slot of the m time slots recorded in the task status vector table are executed statuses;

when the second statuses of the second tasks of the previous $k^{th}$ time slot recorded in the task status vector table are all executed statuses, returning to the step (a); and when any one of the second statuses of the second tasks of the previous $k^{th}$ time slot recorded in the task status vector table is not the executed status, executing at least one of the second tasks of the previous $k^{th}$ time slot having an unexecuted status within next p consecutive time slots in a load reduction mode, and returning to the step (a);

wherein the at least one of the second tasks of the previous $k^{th}$ time slot having the unexecuted status in the thread pool is executed in a same thread pool within the next p consecutive time slots;

wherein m, k, and p are positive integers;

wherein p+k≤m;

wherein the base station apparatus is a cell site for communicating with mobile devices;

wherein p is determined according to the statuses of the second tasks of the previous $k^{th}$ time slot recorded in the task status vector table; and wherein the smaller a number of the executed statuses of the second tasks of the previous $k^{th}$ time slot recorded in the task status vector table is, the greater p is.

2. The self-recovering method as claimed in claim 1, wherein the task status vector table is stored in a memory of the base station apparatus.

3. The self-recovering method as claimed in claim 1, wherein when the processor is in the load reduction mode, a workload for processing subsequent tasks within the next p consecutive time slots is reduced.

4. The self-recovering method as claimed in claim 3, wherein when the workload of the processor is reduced, the processor executes i said subsequent tasks within each of the next p consecutive time slots in the load reduction mode;

wherein i is a positive integer, and i≤n; and wherein n is a number of the first tasks.

5. A base station apparatus, and comprising:

a memory, storing a task status vector table;

a processor, electrically connected to the memory, and executing steps of:

(a) executing multiple first tasks, one by one, during a time period of one of m time slots in a normal mode in a thread pool;

(b) when finishing executing the first tasks, recording first statuses of the first tasks into a task status vector table, wherein the task status vector table further records second statuses of second tasks of the m time slots other than the one of the m time slots having the first tasks;

(c) when finishing recording the first statuses of the first tasks, determining whether all of the second statuses of the second tasks of a previous $k^{th}$ time slot of the m time slots recorded in the task status vector table are executed statuses;

when the second statuses of the second tasks of the previous $k^{th}$ time slot recorded in the task status vector table are all executed statuses, returning to the step (a); and when any one of the second statuses of the second tasks of the previous $k^{th}$ time slot recorded in the task status vector table is not the executed status, executing at least one of the second tasks of the previous $k^{th}$ time slot having an unexecuted status within next p consecutive time slots in a load reduction mode, and returning to the step (a);

wherein the at least one of the second tasks of the previous $k^{th}$ time slot having the unexecuted status in the thread pool is executed in a same thread pool within the next p consecutive time slots;

wherein m, k, and p are positive integers;

wherein p+k≤m;

wherein the base station apparatus is a cell site for communicating with mobile devices;

wherein p is determined according to the statuses of the second tasks of the previous $k^{th}$ time slot recorded in the task status vector table; and wherein the smaller a number of the executed statuses of the second tasks of the previous $k^{th}$ time slot recorded in the task status vector table is, the greater p is.

6. The base station apparatus as claimed in claim 5, wherein when the processor is in the load reduction mode, a workload for processing subsequent tasks within the next p consecutive time slots is reduced.

7. The base station apparatus as claimed in claim 6, wherein when the workload of the processor is reduced, the processor executes i said subsequent tasks within each of the next p consecutive time slots in the load reduction mode;

wherein i is a positive integer, and i≤n; and wherein n is a number of the first tasks.

* * * * *